Nov. 16, 1965   H. NAUTA ETAL   3,217,574
APPARATUS FOR SHEARING AN ELASTOMERIC CELLULAR METERIAL
Filed Jan. 24, 1964   4 Sheets-Sheet 1

Inventors
Howard Nauta
William Gvasty
By Robert S. Brown
Attorney

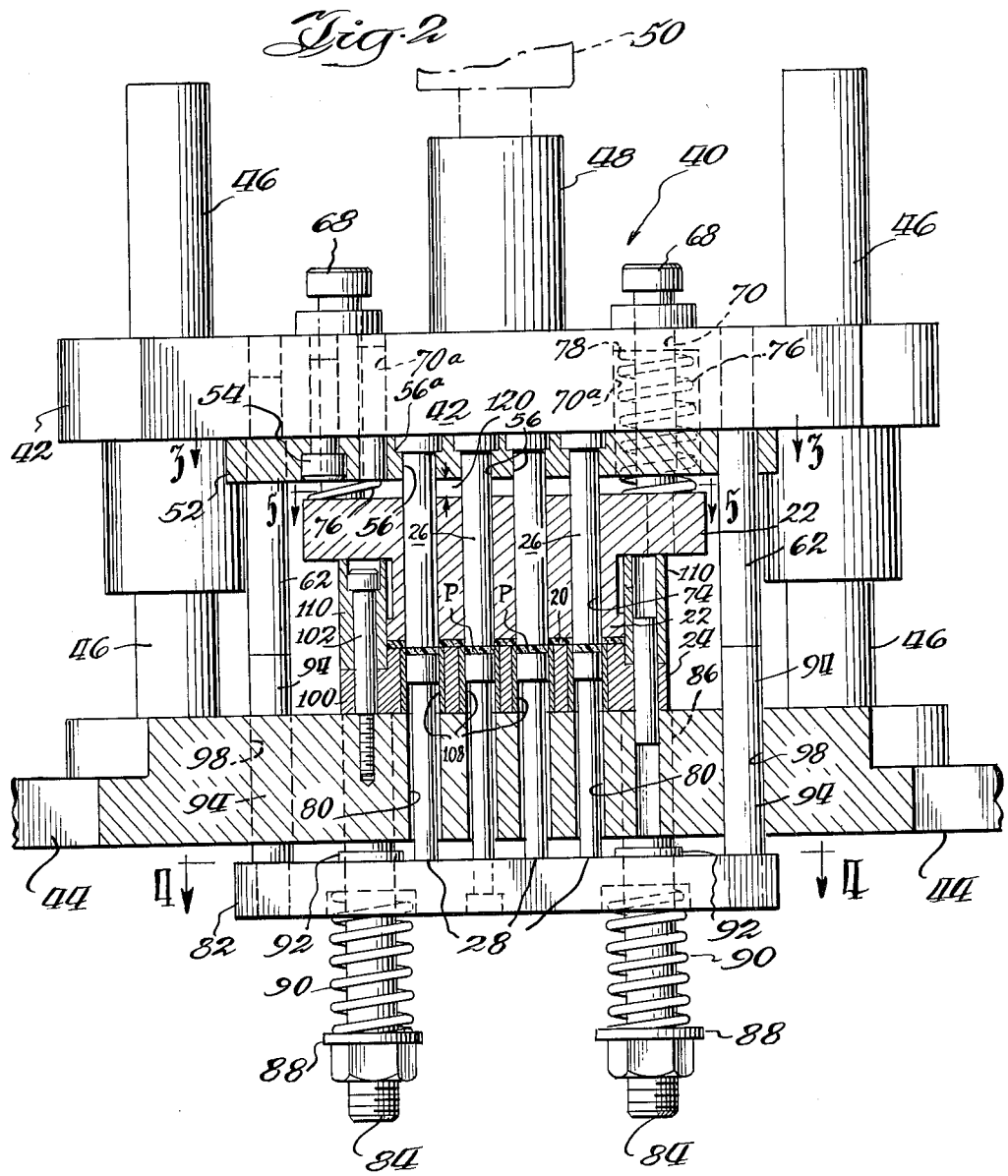

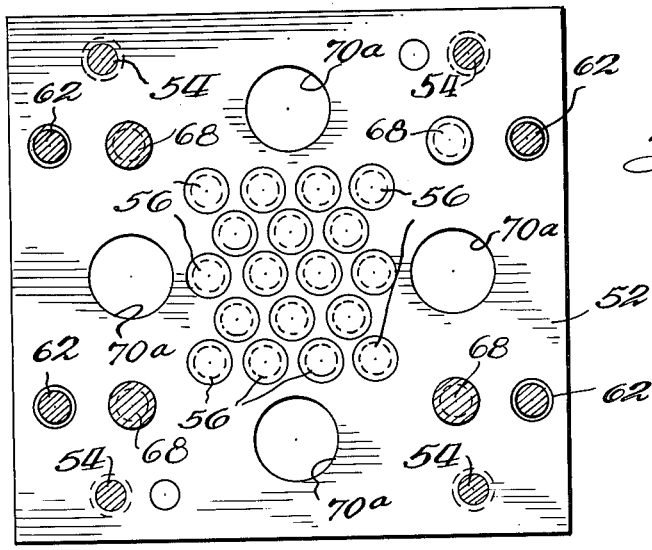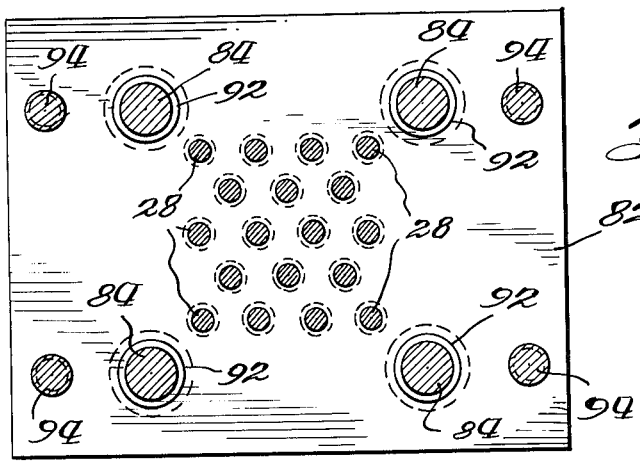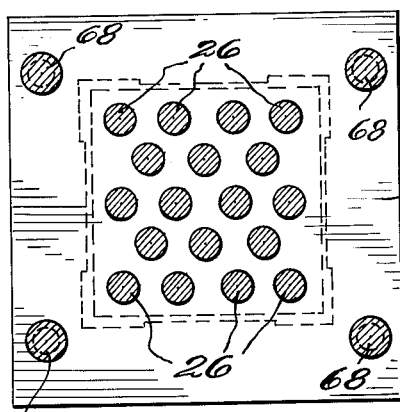

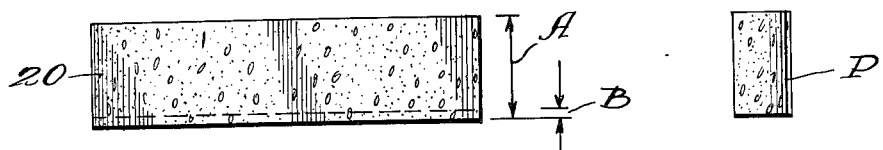
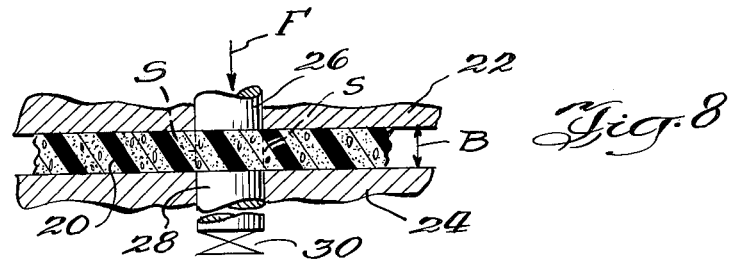
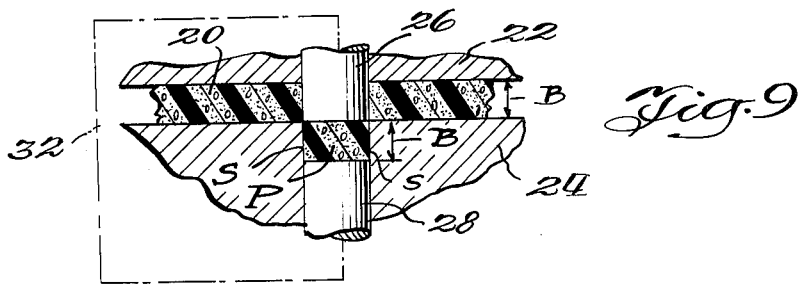
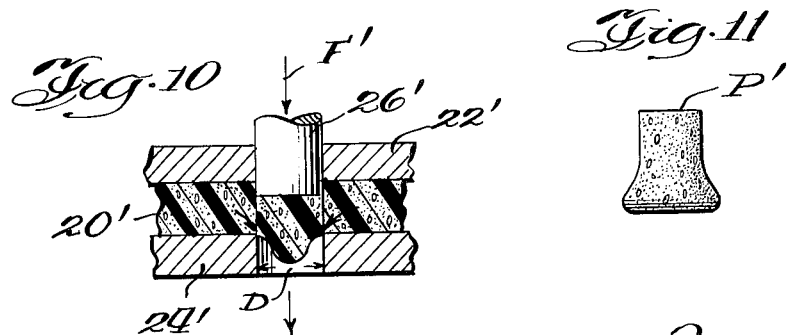
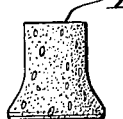

United States Patent Office 3,217,574
Patented Nov. 16, 1965

3,217,574
APPARATUS FOR SHEARING AN ELASTOMERIC CELLULAR MATERIAL
Howard J. Nauta, Waukegan, and William P. Grasty, Zion, Ill., assignors to Abbott Laboratories, North Chicago, Ill., a corporation of Illinois
Filed Jan. 24, 1964, Ser. No. 340,074
6 Claims. (Cl. 83—108)

The present invention relates to an improved method and apparatus for shearing an elastomeric cellular material.

The preparation of accurately formed predetermined shapes from an elastomeric cellular material has presented difficult problems. One of the problems involved is that when a load is applied to an elastomeric material the material becomes distorted, that is, some portion of the body of material is displaced with respect to some other portion which has not been disturbed. Due to the displacement a force action is developed between the molecules of the material which resists the displacement that the applied force has caused. The force action tends to restore the material to its original condition. The result of the above noted action is that when shearing the cellular material the portions thereof depressed or affected by the shear blade are distorted and exert an action upon and likewise are acted upon by adjacent molecules not in contact with the shear blade. The adjacent material tends to urge the elastomer to its static condition with the result that the shape of the immediate shear area is difficult to control.

The general shape and character of the elastomeric cellular material present further difficulties in forming in that it is difficult to maintain the material in its static state during the working operation. Such materials are irregular and easily collapsable. Contact of the forming tool with the material will result in deflection and production of a distorted sheared final form.

One common practice in working with cellular materials to produce a cylindrical shape, for example, is to employ a circular cutting blade rotatable through the material until the shape is completely severed from the matrix. This specific method is limited to the production of circular closed shapes and precludes convenient production of other forms. Additionally, with the above noted cutting method of producing such shapes, small chips of material remain in the open cell faces of the final shape. In some uses of the material the chips are objectionable and an additional cleaning step is required to insure expulsion of all extraneous material from the final produced shape. Furthermore, in order to have a circular revolving cutting tool produce accurately dimensioned parts, the sharpness of its knife edge must be carefully and consistently maintained. This is difficult when cutting an abrasive material such as polyurethane foam where the cutting lip would have to be sharpened after every 10 to 20 pieces cut. A dull cutter will deform the foam during the cut and will produce irregularly shaped parts. Moreover, the rate at which the cutter is fed into the foam will affect the shape of the finished part; the faster the cutter is driven into the foam the more distortion results during the cut.

In accord with the present invention a method and apparatus are provided for producing shaped forms from an elastomeric cellular material. The method and specific apparatus provided lend themselves to production of large quantities of formed bodies in optimum time. No chips remain after the formed bodies are produced and the control of the dimensions of the bodies may be closely maintained. The method and apparatus involve compression of the elastomeric cellular material until the cells of the material are substantially fully collapsed and maintenance of this collapsed condition while shearing the desired form from the matrix.

It, accordingly, is a general object of the present invention to provide an improved apparatus for shearing and for producing bodies of predetermined shapes from an elastomeric cellular material.

A further object of the present invention resides in the provision of an improved apparatus for shearing an elastomeric cellular material wherein the material is fully compressed during the shearing operation.

Another object of the present invention resides in the provision of an improved method for shearing a cellular material wherein bodies having close final tolerances may be maintained.

An additional object of the present invention resides in the provision of an improved method for shearing an elastomeric cellular material in an operation wherein the final body produced by said shearing method is free of extraneous materials and subsequent processing steps to clean the material are avoided.

A further object of the present invention resides in the provision of an improved apparatus for shearing an elastomeric cellular material wherein the material is fully compressed between a pair of mating platens and the shearing of the material is accomplished while maintaining full compression of the sheared area and the area adjacent thereto.

Another object of the present invention resides in the provision of an improved apparatus for shearing a predetermined shape in an elastomeric cellular material wherein the body to be sheared is first fully compressed and is then sheared while compressed and supported on both faces.

An additional object of the present invention resides in the provision of an improved method and apparatus for shearing an elastomeric cellular material that is convenient to use and that permits shearing of said materials in optimum processing time, said apparatus further being economical to manufacture and use and durable for continued use.

Still another object of the present invention resides in the provision of an improved method for shearing an elastomeric cellular material that is easy to use and that is readily adapted for use in shearing any compressible material in any shape.

The novel features which are believed to be characteristic of the present invention are set forth with particularity in the appended claims. The invention itself, however, together with further objects and advantages thereof, will best be understood by reference to the following description taken in connection with the accompanying drawings, in which:

FIGURE 2 is a side elevation, partly in section, of the shearing apparatus of FIGURE 1, illustrating full compression of the elastomeric material and the shearing thereof;

FIGURE 3 is a plan view of the shear retaining member, taken along line 3—3 of FIGURE 2;

FIGURE 4 is a plan view of the lower retaining member, taken along line 4—4 of FIGURE 2;

FIGURE 5 is a view of the upper platen of the apparatus, taken along line 5—5 of FIGURE 2;

FIGURE 6 is a schematic view of the cellular material schematically representing the degree of compression of the material utilized in carrying out of the method set forth herein;

FIGURE 7 is a side elevation of a cylindrical body sheared from an elastomeric matrix with the method set forth herein;

FIGURE 8 is an enlarged fragmentary schematic representation of the elastomeric material in accordance with the method set forth herein prior to shearing of the material;

FIGURE 9 is a fragmentary enlarged schematic representation of the shearing step employing the method set forth herein with full compression maintained during shearing;

FIGURE 10 is a schematic view representing the material deformation which occurs when shearing an unsupported material; and FIGURE 11 is a representative side view of a sheared circular portion when sheared in accordance with the method set forth in FIGURE 10.

*The method*

Figure 1:
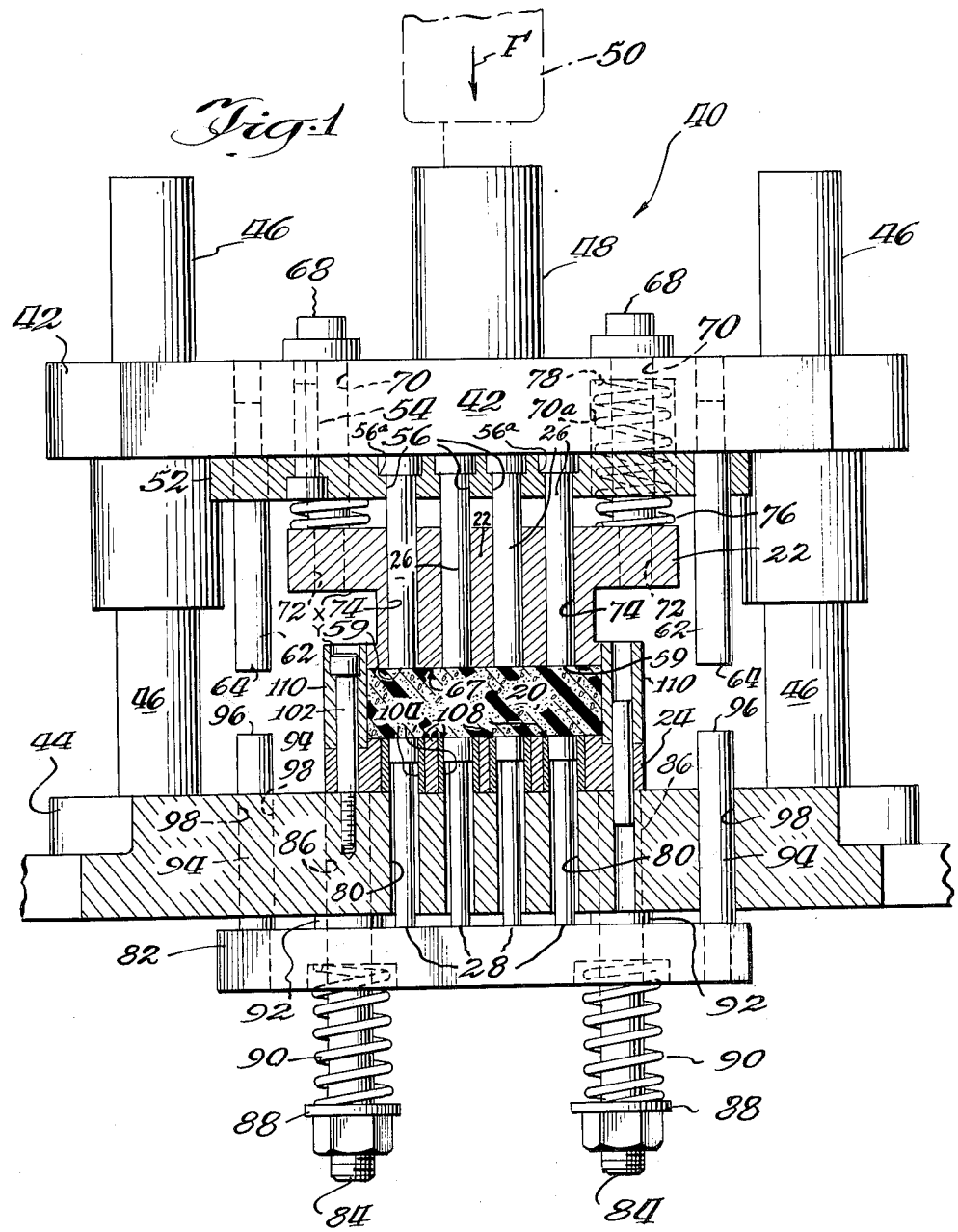
FIGURE 1 is a side elevation, partly in section, of the shearing apparatus of the present invention.

The present invention involves a method for shearing an elastomeric cellular material.

Working with materials of the type noted herein is difficult primarily due to the fact that the material is not dimensionally stable under working conditions. Special handling and working procedures must be devised and provided when working with such elastomeric materials.

In accord with the method of the present invention, the body of elastomeric material is compressed to the point where further significant compression or deflection thereof would likely result in deformation of the material. It has been found that shearing of the material in this condition will be effective and accurate as long as full compression is maintained without substantial change in cross-sectional dimensions of the material.

The method set forth herein contemplates the use of suitable means for compression and shearing of the material. The elastomeric cellular material, such as open or closed cell polyurethane material, is first compressed over an area including the area of proposed shear and the space on each side of the immediate area of shear to produce substantially uniform compressive stress within the material. The compression of the material must be sufficient to assure elimination or minimization to a less than significant level of stress components parallel to the planes of compression for points extending from the plane of shear to points spaced outwardly therefrom in all directions to avoid interaction of such stress components. The compression may be accomplished between a pair of platens having mating portions bounded by the line of shear.

Air must be expelled from the cellular material as it is collapsed during compression thereof. Expulsion of trapped air is essential to assure a stable cellular body in collapsed form. A significant amount of trapped air in the body may result in an unstable compressed body in that air may flow from cell to cell during shearing and free a cell adjacent the shear blade from fully stressed or compressed condition thereby permitting interaction of the material surrounding the free cell (or cells) with adjacent cells which may, in turn, give rise to shearing of a distorted shape.

While the cellular material is in fully compressed condition the shear blade is passed therethrough to separate the sheared area thereof from the matrix of the material. The shear blade is passed through the material while the shear area and the area adjacent thereto is maintained in fully compressed condition. There is no relaxing of the compressed condition of the material during shearing. If a closed line of shear is defined during shearing the closed area that is sheared is maintained fully compressed during shearing.

A representative body of elastomeric cellular material is schematically illustrated at 20 in FIGURE 8 of the drawings. The material in its static, unstressed condition is of thickness represented at A in FIGURE 6. The material 20 is inserted between a pair of mating platens 22 and 24, as illustrated in FIGURES 8 and 9. The platens 22 and 24 are moved together to compress the material 20 disposed therebetween and to collapse said material to its compressed thickness B, as seen in FIGURE 6, and in the enlarged views of FIGURES 8 and 9. Compression of the material 20 establishes compressive stresses in the body of material. The compression, as noted hereinabove, is continued to an extent which assures substantially uniform compressive stress within each portion of the area that is compressed, which area includes the immediate shear area noted by the dashed lines S of FIGURE 8, and the area surrounding the shear area for a sufficient distance to provide and maintain uniform compression stress in the shear plane defined along said dashed lines during the shearing operation. The material 20 is shown in the compressed state in FIGURE 8 prior to shearing. The material beyond the boundaries of the platens 22 and 24 (not shown in the drawings) may be unsupported without significant effect upon the character of the shear with the above noted method.

The platens 22 and 24 each carry a movable shear member therewith, indicated at 26 and 28, respectively, in FIGURES 8 and 9. The members 26 and 28 are mounted for movement independent of the platens 22 and 24. Shearing of the compressed body of elastomeric material may be realized by moving the shear members therethrough. In the illustration of FIGURES 8 and 9 the shear member 26 is moved downwardly through the material upon application of an external force, schematically represented by the force vector F, FIGURE 8. The bottom support member 28 is maintained in positive compressive engagement with the material 20 during the shearing operation to assure full compression of the material in the shear area during said operation. Full compressive force upon the material during the shear operation is ensured by the means schematically illustrated in FIGURE 9. The shear members 26 and 28 are provided with means 32 which are more fully described infra, to permit movement of the two members in unison as an integral body during the shearing operation. With this means of control each increment in movement of the member 26, for example, finds response in an equal increment of movement of the member 28 in the same direction whereby a predetermined compressive force upon the material 20 is maintained during shearing of the material.

One of the materials contemplated for use with the method and apparatus of this invention is polyurethane foam, which has a cellular structure. These cells often contain entrapped air and when the cells are broken upon compression the air must be provided with a means of escape in order to ensure complete, undeformed collapse of the polyurethane sheet. To permit this necessary escape of air member 28 is machined to fit somewhat loosely in platen 24, so that air may escape through the platen 24, around the member 28. It is also possible to provide platens 22 and 24 with small ports or passageways therethrough (not shown) to further facilitate the escape of any entrapped air.

In many applications of foam materials, such as for use in paint rollers or hair curlers, it is necessary to break all of the air-containing cells in the foam material, so that the resulting body will have a high degree of absorbency. This is normally accomplished by a process distinct from the cutting process by which the desired body is obtained. With the instant method and apparatus, the air-containing wells are broken substantially simultaneously with the formation of the cut body, thereby eliminating the need for this extra step.

The sheared body P (FIGURE 9) is illustrated in side elevation in FIGURE 7. The shear plane may be closely controlled and in this illustration is defined in a vertical plane defined a closed area. Where dimensional accuracy of the sheared body P is important it is necessary that the shear plane be predictable and reproducible for each operation. Close dimensional tolerances are often necessary when the sheared body is to be used in experimental or analytical activities, for example. An additional advantage of shearing elastomeric cellular materials with the method disclosed hereinabove resides in the fact that the sheared area is clean, as sheared. There are no chips or other extraneous matter to be cleaned away prior to use.

Shearing of an unsupported body of material is schematically illustrated in FIGURES 10 and 11. With full compression of the material 20', as illustrated in FIGURE 10, by the platens 22' and 24' a force F' (indicated by vector) is applied to the material 20' through shear member 26'. As the member 26' is moved into the material 20' by the force F' to shear along a predetermined shear plane a portion of the material 20' extends into the opening D of the lower platen 24' (which area defines the area of the sheared body P'), notwithstanding the fact that the material is compressed between the platens 22' and 24'. Without support along the lower face it is not possible fully to compress the area P'. As the member 26' extends into and is forced through the body 20' the material adjacent the shear plane and residing in the matrix of the body 20' is subjected to high tension stress in direction parallel to the shear plane. The material in the matrix of the body 20' will tend to move to the open area defined at D in the lower platen 24' to a position of lower stress. As a result of this action and shearing of the body of material without supporting the lower face and without full compression of the area adjacent the shear plane the sheared body P', shown in FIGURE 11, will define a distorted sheared form. Shearing in this manner will not provide reproducible dimensionally accurate bodies nor can there be prior prediction of the sheared shape. Thus, it is seen that compression alone will not be sufficient to assure accurate, reproducible shearing of elastomeric cellular materials. The compressive force must be maintained on the material through the shear operation at least at the same level as achieved during the pre-shear compression so that the material will be in a relatively stable, highly stressed condition during shearing thereof.

The apparatus

The apparatus of the present invention is set forth in FIGURES 1 through 7 of the drawings, and is indicated generally at 40 in FIGURES 1 and 2. The apparatus includes upper and lower support members 42 and 44, respectively. The upper and lower support members 42 and 44 are joined by connecting posts 46 in a manner that permits relative movement between said members. The upper support member 42 includes a boss 48 which is adapted to be attached to an external force producing member, such as hydraulic press, illustrated in outline by the dashed lines 50. The member 50 may be a hydraulic or air cylinder, or other suitable means adapted to produce a force F upon the upper support member 42 through the boss 48. The member 44 is rigidly affixed to a suitable bed or support member (not shown) to define a base support for the apparatus.

As will be described in greater detail hereinbelow, the specific apparatus set forth relates to a means for shearing a circular plug or plungs from an elastomeric cellular matrix. It should be observed that the teachings set forth may be adapted to apparatus for shearing other closed shapes, or, for shearing open shapes or straight lines.

An upper retaining plate 52 is rigidly secured to the upper support member 42 of the apparatus by any suitable fastening means, such as by welding, bolts, or the like, the particular means of rigid attachment forming no part of the present invention of itself. In particular, the plate 52 is shown as being affixed to the upper support plate by means of machine bolts 54. The plate 52 is provided with a plurality of openings 56 extending therethrough. Each of the openings 56 is adapted to seat the end of a punch member 26. Punches 26 are axially positioned within the openings 56 and with respect to the member 52 by the heads 60 thereof which engage the shoulders 56a of the openings 56 in the retaining plate 52.

A set of posts 62 are rigidly affixed at one end thereof to the respective corners of the upper support member 42 and extend downwardly therefrom to terminate in free ends 64, as indicated in FIGURE 1 of the drawings. The posts 62 extend through the plate 52.

An upper movable platen 22 is affixed in suspended fashion to the upper support member 42 by a plurality of bolts 68. The heads of bolts 68 are adapted to engage the upper face of the support member 42 in abutting relation therewith to extend through openings 70 in the member 42 and to be threadably received within threaded openings 72 in the flange of the upper movable platen 22.

The platen 22 is provided with a plurality of punch receiving openings 74. The punches 26 are telescopically received, one within each of the openings 74 of said platen 22. The punches and platen are supported and assembled with respect to the upper support member 42 such that the lower terminals 59 of each of the punches 26 is disposed flush with the lower face 67 of the platen 22, thereby to present a uniform compressive face.

The opening 70 of the upper support member 42 defines a large diameter opening 70a along a portion of the length thereof. A spring member 76 is adapted to be received one within each of the large openings 70a of the member 42. Each spring member 76 at one end abuts the shoulder 78 defined between the large diameter opening 70a and the opening 70 of the member 42 and at the other end by the upper face of the platen 22 thereby biasing the platen 22 away from the support member 42 to its maximum adjustable extent and bringing the heads of the bolts 68 into positive abutting engagement with the upper face of the support member 42.

As noted hereinabove the lower support member 44 is relatively movably affixed with respect to the upper member 42 through the posts 46, said posts 46 being rigid with the member 44. The member 44 defines a plurality of support pin receiving openings 80 therein extending therethrough.

A lower retaining plate 82 is relatively movably affixed to the support member 44 by the bolts 84. The bolts 84, as shown, are threadably received at one end within threaded openings 86 in the lower support member 44 of the apparatus. The other end of each of the bolts 84 is provided with a collar 88 adjustably positioned upon said bolts. One end of a spring 90 is in abutting relation with the collar 88, the other end in abutting relation with the lower face of the lower retaining plate 82 thereby to bias the retaining plate 82 into abutting engagement with the spacer members 92.

Posts 94 are affixed at one end to the lower retaining member and terminate in free ends 96, said posts 94 extending through openings 98 in the lower support member 44. The terminal ends 96 of the posts 94 are in co-axially aligned spaced relation with the terminal ends 64 of the posts 62.

A lower platen 24 is rigidly affixed to the lower support member 44 by machine bolts 102, or the like. The platen 100 defines a plurality of openings 104 extending therethrough. Lower support pins 28 are rigidly affixed at one end to the lower retaining member 82. The other end of each of the pins extends through the openings 80, through the openings 104 of the lower platen 24 and terminate flush with the upper face of the lower platen to define a smooth compressive face. The openings 104 of the lower platen 24 are each provided with a protective casing of hardened material 108.

A material wall 110 is rigidly affixed to the flange of the lower platen 24 of the apparatus, said wall defining the material enclosure.

The elastomeric cellular material is positioned within the apparatus in the recess defined by the retaining wall 110 thereof, as illustrated in FIGURE 1 of the drawings. In the embodiment set forth herein a plurality of circular shapes P (as illustrated in FIGURE 7) are adapted to be sheared from the matrix 20 and the entire body of material is adapted to be compressed and fully confined within the wall 110.

The material 20 is compressed by exerting a force F upon the upper support member 42. The upper member 42 moves downwardly under the action of the force F, the downward movement of the member 42 being guided by the posts 46 of the apparatus. The support member 42, upper retaining plate 52, upper platen 22 and punches 26 move downwardly in unison toward the compressive face of the lower platen during initial movement of said support member 42. Movement of the above-noted members continues in downward direction, in unison, until the material is compressed to a predetermined thickness. This predetermined thickness is reached when surface X of upper platen 22 abuts surface Y of wall 110, which is rigidly connected to lower platen 24. This thickness, B (see FIGURE 9), is equal to the spacing between the opposed faces of platens 22 and 24 and is determined by the vertical dimension of wall 110, and may be varied to suit the particular material being worked on. It should be observed that the spring rate of the springs 76 is such that the platen 22 will be maintained in spaced relation with respect to the member 52 of the upper member during downward movement. The rate of the spring 76 is slightly greater than the maximum compressive force required for predetermined compression of the material 20 in the apparatus 40. The internal material forces resisting compression will not be sufficient to resist the downward movement of the platen 22 into greater compressive relation with the material during downward movement of the upper support member 42.

The apparatus herein set forth is constructed such that once a predetermined level of compression of the material is realized further downward movement of the member 42 under the action of an applied force will not give rise to further compression of the elastomeric cellular material but rather will shear the cellular material in the predetermined shear area.

Continued application of force to the member 42 after full compression of the body of material 20, and after end-to-end engagement of the posts 62 and 94, will result in equal incremental movement of the members 42 and 82. The member 44, of course, is affixed to a base support member (not shown) and defines a rigid reference for the apparatus. The post 62 applies a force against post 94 and therethrough to the member 82 of the apparatus. Member 82 will move down against the springs 90.

Movement of the member 42 downwardly urges identical downward movement of the punches 26 said members upon continued downward movement extending into the compressed body of material to define a shear plane therein along the periphery of the members 26. A rigid connection is defined between the punches 26 and the lower support members 28 during shear action. The members 26 are rigidly connected to the upper support member 42 which member 42 also rigidly supports the downwardly extending posts 62 of the apparatus. The posts 62, during shear action, are in end-to-end abutting engagement with the posts 94 said posts 94 being rigid with the lower retaining plate 82. The pins 28 also are rigid with respect to the plate 82 to define the completed rigid shear assembly for full support of the elastomeric cellular material during shear thereof. As the shear members 58 move down through the compressed material in shear action the lower support members 28 move, as a body, away from the compression face of the lower platen 100 of the apparatus. The punches 26 and support members 28 move bodily during shead action to provide full compressive support for the cellular material during shear thereof. Thus, the material adjacent the shear plane of the material is fully supported at all times during shear, both in the areas not moved from the original plane of compression and in the sheared areas which are moved away from the original plane of compression, to sever the desired area from said body of material.

The space 120 defined between the lower face of the retaining plate 52 and the upper face of the platen 22 should be sufficient to permit full movement of the shear member 58 downwardly through the compressed body of the material without abutting engagement. The springs 76 are adapted to maintain full compressive force against the body of material during shear action.

When the shear members 58 extend fully through the compressed body of material the force F is withdrawn and the shear apparatus permitted to reset itself to position for the next shear operation. When the force is withdrawn the springs 90 acting againts the lower retaining plate 82 move said plate 82 upwardly against the lower support member 44 and in the action urging the upper support member 44 through posts 94 and 62 upwardly to reset position. Continued withdrawal of the applied force will bring the upper face of the support member 42 into engagement with the lower face of the bolt heads 68 to draw the platen 22 and punches 26 upwardly. The compresesd body (not sheared) of material 20 is released and may be withdrawn from the recess. The lower members 28 of the apparatus eject the sheared areas from the shear member receiving openings 80 back into the original plane of compression of the body of material thus permitting easy, convenient removal of the sheared area along with the matrix.

The member 42, and associated shear means, are moved upwardly along guide posts 46 of the appaartus a sufficient distance during reset to permit easy insertion of another body of material into the materials receiving recess of the apparatus for a subsequent shearing operation.

While a specific embodiment of the present invention is shown and described it will, of course, be understood that other modifications and alternative constructions may be used without departing from the true spirit and scope of the invention. It is intended by the appended claims to cover all such modifications and alternative constructions as fall within their true spirit and scope.

What is claimed is:

1. Apparatus for cleanly shearing a body of collapsible cellular material comprising: a pair of aligned platens having opposed faces adapted to compress a body of cellular material therebetween and respectively defining at least one pair of coaxial punch housings, a punch reciprocably mounted in each of said housings, each said punch having a head, one of said punches adapted to extend from a first position wherein the punch head is coplanar with the face of the platen in which it is mounted to a second position in which it extends into said housing of the other platen to shear a section of said material, stop means adapted to limit movement of said upper platen to a fixed distance from said lower platen, and means responsive to movement of said one punch toward said other platen when said upper platen has reached the limit of its downward movement to displace the other punch away from said one punch and maintain a fixed distance between said punches.

2. Apparatus for cleanly shearing a body of collapsible cellular material comprising: a pair of aligned platens having opposed planar faces adapted to compress a body of cellular material therebetween, means rigidly mounting one of said platens, means reciprocably mounting the other of said platens, said platens respectively defining at least one pair of coaxial punch housings, a punch reciprocably mounted in each of said housings, each said punch having a head, one of said punches adapted to extend from a first position wherein the head of said one punch is coplanar with the face of the platen in which it is mounted to a second position wherein said one punch extends into a housing of the other platen to shear said material, stops means adapted to limit movement of said upper platen to a fixed distance from said lower platen; and means responsive to movement of said one punch toward said other platen when said upper platen has reached the limit of its downward movement to displace the other punch away from said one punch while maintaining a fixed distance between said punches.

3. Apparatus for cleanly shearing a body of collapsible cellular material comprising: a pair of aligned platens having opposed coextensive planar faces adapted to compress a body of cellular material therebetween and respectively defining at least one pair of coaxial punch housings, a punch reciprocably mounted in each of said platens, each said punch having a head, one of said punches adapted to be displaced from a first position wherein the head of said one punch is coplanar with the face of its platen to a second position wherein said head of said one punch extends into the housing of the other platen to shear said material, stops means adapted to limit movement of said upper platen to a fixed distance above said lower platen, upstanding means mounted about the periphery of said face of said other platen and adapted to snugly engage the periphery of a workpiece, and means responsive to movement of said one punch toward said other platen and operative when the face of said upper platen has reached the limit of its downward movement to displace the other punch away from said one punch and maintain a fixed distance between said punch heads.

4. An apparatus for cleanly shearing a body of collapsible cellular material comprising: a lower platen having a planar upstanding work-supporting face, means rigidly mounting said lower platen, an upper platen having a planar depending work-compressing face, means mounting said upper platen for vertically reciprocating movement, means adapted to engage said upper platen and apply a compressive force thereto, each of said platens defining at least one housing, the housings of the upper and lower platens being coaxial and substantially identical in cross-section, a punch slidably mounted in each of said housing, limit means limiting the downward movement of said upper platen to a position spaced from said lower platen, means operatively interconnecting said upper and lower punches and maintaining a fixed distance between respective said coaxial punches when said upper platen reaches the limit of its downward movement wherby said lower punch continues to move downwardly while said upper punch shears sections of the workpiece and said lower punch completely supports the workpiece section being sheared.

5. An apparatus for cleanly shearing a body of collapsible cellular material comprising: a lower platen having a planar upstanding work-supporting face, means rigidly mounting said lower platen, an upper platen having a planar depending work-compressing face coextensive with the face of said lower platen, means mounting said upper platen for vertically reciprocating movement, means mounted proximate said upper platen and adapted to apply a compressive force thereto, each of said platens defining a plurality of housings, each housing in said upper platen having a corresponding coaxial housing of substantially identical cross-section in said lower platen, a punch vertically movably mounted in each of said housings, the punches in each of said platens having heads normally coplanar with the faces of the respective platens, limit means limiting the downward movement of said upper platen to a position spaced from said lower platen, means adapted to rigidly interconnect respective coaxial pairs of said upper and lower punches when said upper platen reaches the limit of its downward movement whereby said upper and lower punches continue to move downwardly and maintain a fixed vertical distance therebetween while said upper punches shear sections of the workpiece and the lower punches completely support the workpiece sections being sheared.

6. An apparatus for cleanly shearing a body of collapsible cellular material comprising: a lower platen having a planar upstanding work-supporting face, upstanding means peripherally encompassing said face of said lower platen and adapted to snugly engage the periphery of a workpiece, means rigidly mounting said lower platen, an upper platen having a planar depending work-compressing face coextensive with the face of said lower platen, means mounting said upper platen for vertically reciprocating movement, said platens each defining a plurality of housings, each housing in said upper platen having a corresponding coaxial housing of substantially identical cross-section in said lower platen, a punch slidably mounted in each of said housings, means adapted to apply a downward force to said upper platen and the punches therein, the punches in each of said platens having heads which are normally coplanar with the faces of the respective platens, limit means limiting the downward movement of said upper platen to a position spaced from said platen, means operatively interconnecting respective coaxial pairs of said upper and lower punches to move the same in unison and maintain a fixed distance therebetween when said upper platen reaches the limit of its downward movement, whereby said upper and lower punches continue to move downwardly while said upper punches shear sections of the workpiece and the lower punches support the workpiece sections being sheared.

References Cited by the Examiner
UNITED STATES PATENTS

| | | | |
|---|---|---|---|
| 360,149 | 3/1887 | Fowler | 83—176 X |
| 1,811,987 | 6/1931 | Wales | 83—128 X |
| 2,103,120 | 12/1937 | Sabo et al. | 83—568 X |

WILLIAM W. DYER, JR., *Primary Examiner.*